United States Patent [19]
Giesfeldt et al.

[11] Patent Number: 5,958,558
[45] Date of Patent: Sep. 28, 1999

[54] CORRUGATING ADHESIVES EMPLOYING TAPIOCA FIBER

[75] Inventors: J. E. Todd Giesfeldt, La Grange; Jack R. Wallace, Bolingbrook, both of Ill.

[73] Assignee: CPC International Inc., Englewood Cliffs, N.J.

[21] Appl. No.: 09/024,441

[22] Filed: Feb. 17, 1998

Related U.S. Application Data

[62] Division of application No. 08/619,287, Mar. 18, 1996, Pat. No. 5,777,005.

[51] Int. Cl.$^6$ .................................. B32B 3/28; B31F 1/20
[52] U.S. Cl. ......................... 428/182; 156/210; 156/328; 106/162.1; 106/206.1; 106/211.1; 106/208.3
[58] Field of Search .................................. 524/47, 52, 53, 524/48; 106/162.1, 206.1, 211.1, 208.3; 428/182, 507, 511; 156/209, 210, 328

[56] References Cited

U.S. PATENT DOCUMENTS

| | | | |
|---|---|---|---|
| 2,102,937 | 12/1937 | Bauer | 134/23.4 |
| 3,085,026 | 4/1963 | Weisgerber et al. | 428/182 |
| 3,775,145 | 11/1973 | Ware et al. | 106/150 |
| 3,944,428 | 3/1976 | Schoenberg et al. | 106/213 |
| 4,094,718 | 6/1978 | Czerwin | 156/210 |
| 4,600,739 | 7/1986 | Krankkala | 524/48 |
| 4,677,145 | 6/1987 | Krankkala | 524/48 |
| 4,787,937 | 11/1988 | Leake | |
| 4,826,719 | 5/1989 | Murdock et al. | 524/53 |
| 4,855,354 | 8/1989 | Mohler | 156/210 |
| 4,941,922 | 7/1990 | Snyder | 524/214 |
| 5,075,360 | 12/1991 | Fitt et al. | 524/48 |
| 5,358,559 | 10/1994 | Fitt et al. | 106/213 |
| 5,405,437 | 4/1995 | Leake | 106/210 |
| 5,503,668 | 4/1996 | Giesfeldt et al. | 106/162 |

FOREIGN PATENT DOCUMENTS 0552 478 A2  12/1992  European Pat. Off. .
97 30 1604   2/1998   European Pat. Off. .

OTHER PUBLICATIONS

Chemica Abstracts, vol. 89, No. 11.

*Primary Examiner*—Donald Loney
*Attorney, Agent, or Firm*—Norris, McLaughlin and Marcus

[57] ABSTRACT

Carrier-type corrugating adhesives are prepared using a carrier phase comprising a combination of tapioca fiber and corn fiber or tapioca fiber and spent germ flake as a substitute for modified or unmodified corn starch to provide an adhesive composition.

10 Claims, 6 Drawing Sheets

CORRUGATING ADHESIVES EMPLOYING TAPIOCA FIBER

CROSS-REFERENCE TO RELATED APPLICATIONS

This is a divisional application of Ser. No. 08/619,287, filed Mar. 18, 1996 now U.S. Pat. No. 5,777,005.

BACKGROUND OF THE INVENTION

1. Field of the Invention

The present invention relates to corrugating adhesives which contain a composition comprising tapioca fiber in combination with corn fiber and/or spent germ flake as a replacement for starch in the carrier. More particularly, the invention relates to high speed corrugating adhesives which are prepared by incorporating a composition comprising tapioca fiber in combination with corn fiber and/or spent germ flake in place of normally used corn starch in carrier type adhesive formulations to obtain a product which provides the benefits normally associated with using modified starch in the carrier. The invention provides excellent finished paste viscosity stability and permits a high level of solids in the finished paste.

2. Description of the Related Art

U.S. Pat. No. 5,358,559 issued to Fitt et al. provides a detailed description of the components and manufacturing process involved in producing corrugated products. Corrugated products, such as corrugated board which can be formed into various shapes, such as boxes, are made of corrugated medium bonded to flat sheets of paper. "single-facer" board comprises one sheet of flat paper bonded to the corrugated medium and "double-backer" or "double-facer" is produced when one flat sheet is bonded to the other side of the corrugated medium.

The Fitt et al. patent describes the adhesive used in the corrugating process as generally comprising starch, caustic, a boron containing compound and, where water resistance is needed, a water-proofing agent. As the main binder of the adhesive composition of corrugating paper, the starch is gelatinized in the corrugating process as it penetrates the paper fiber. The remaining ingredients modify the basic properties of the starch. Starch-based adhesives can be of the carrier, no-carrier and carrier-no-carrier type. The adhesive is normally applied to one or both sides of the corrugated medium and paper is attached thereto and is bonded by pressure and heat. The viscosity of the adhesive allows for the paper to be set in place prior to the heat and pressure bonding. The speed at which a corrugating machine can operate is in part limited by the strength of the early adhesion, called the green bond, of the paper to the corrugating medium.

The patent discloses that fibers can be added to the starch-based corrugating adhesives to enhance adhesion and dispersion and yield improved adhesive characteristics including increased waterproofness, dry strength, viscosity and adhesiveness. The patent also discloses that hemicellulose, a natural and readily available component of corn kernels and hulls can be used to enhance the adhesiveness of starch-based corrugating adhesives. U.S. Pat. No. 4,941,922 is distinguished in the specification of the Fitt et al. patent as employing relatively large fibers such as natural fibers including wood, paper, cotton and rayon, synthetic fibers including Nylon, polyester, polypropylene, and Lycra Spandex and metallic fibers which are said to physically intertwine and thereby enhance adhesive properties.

U.S. Pat. Nos. 4,826,719, 4,677,145, 4,600,739, and 4,094,718 disclose starch based corrugating adhesives which further comprise polyvinyl alcohol to increase the viscosity and strength of the bond between the corrugating medium and the liner material. Noting certain limitations in these disclosures, U.S. Pat. No. 5,075,360 to Fitt et al. disclosed a carrier-type corrugating adhesive wherein the carrier phase is prepared by further hydrolyzing a cold water soluble, partially hydrolyzed, polyvinyl alcohol in situ in the presence of water, caustic and starch, modified starch or dextrin.

The entire disclosures of these patents are hereby incorporated into the present disclosure by reference thereto.

It has now been discovered in connection with the present invention that a combination of tapioca fiber and corn fiber or tapioca fiber and spent germ flake can be used in place of corn starch in corrugating adhesives. The tapioca fiber, which generally can contain from about 35% to about 70% by weight of tapioca starch, has been found to thin, losing viscosity, in high alkaline conditions. This is in contrast to corn fiber which thickens under such conditions. The use of tapioca fiber and corn fiber or spent germ flake in place of corn starch permits the corrugator to use less material in formulating the adhesive and still achieve similar or stronger adhesive properties. The use of unmodified or pearl starch in carrier type corrugating adhesive formulations is limited to no more than 200 pounds in conventional equipment because it tends to build too much viscosity in the primary portion of the mix when more is used. The relatively small amount of gelled primary solids limits the total solids in the adhesive paste to a maximum of about 23–24% dry basis (db). By contrast, when modified starch is used in the carrier type adhesives, less viscosity is built at the same solids level as pearl starch and, therefore, amounts of 250–400 pounds of modified starch can be used in the carrier portion of the mix. This provides for increases in the total solids in the finished paste of approximately 30–33%, which accounts for most of the functional benefits of modified starch carriers. The use of the combination of tapioca fiber and corn fiber or tapioca fiber and spent germ flake in place of pearl or modified starch allows for the use of amounts of material similar to the starch formulations yet provides a paste having the functional benefits of modified starch formulations.

SUMMARY OF THE INVENTION

The corrugating adhesive of the invention is a carrier type corrugating adhesive which contains a composition comprising tapioca fiber in combination with corn fiber and/or spent germ flake in place of some or all of the corn starch normally employed in the typical adhesive composition. The corrugating adhesives of the invention may also contain up to about 5% polyvinyl alcohol (PVOH) or polyvinyl acetate (PVA).

All parts and percentages set forth herein are by weight (w/w) based on total starch plus fiber (commercial basis) unless specified otherwise.

DETAILED DESCRIPTION OF THE INVENTION

Figure 1:
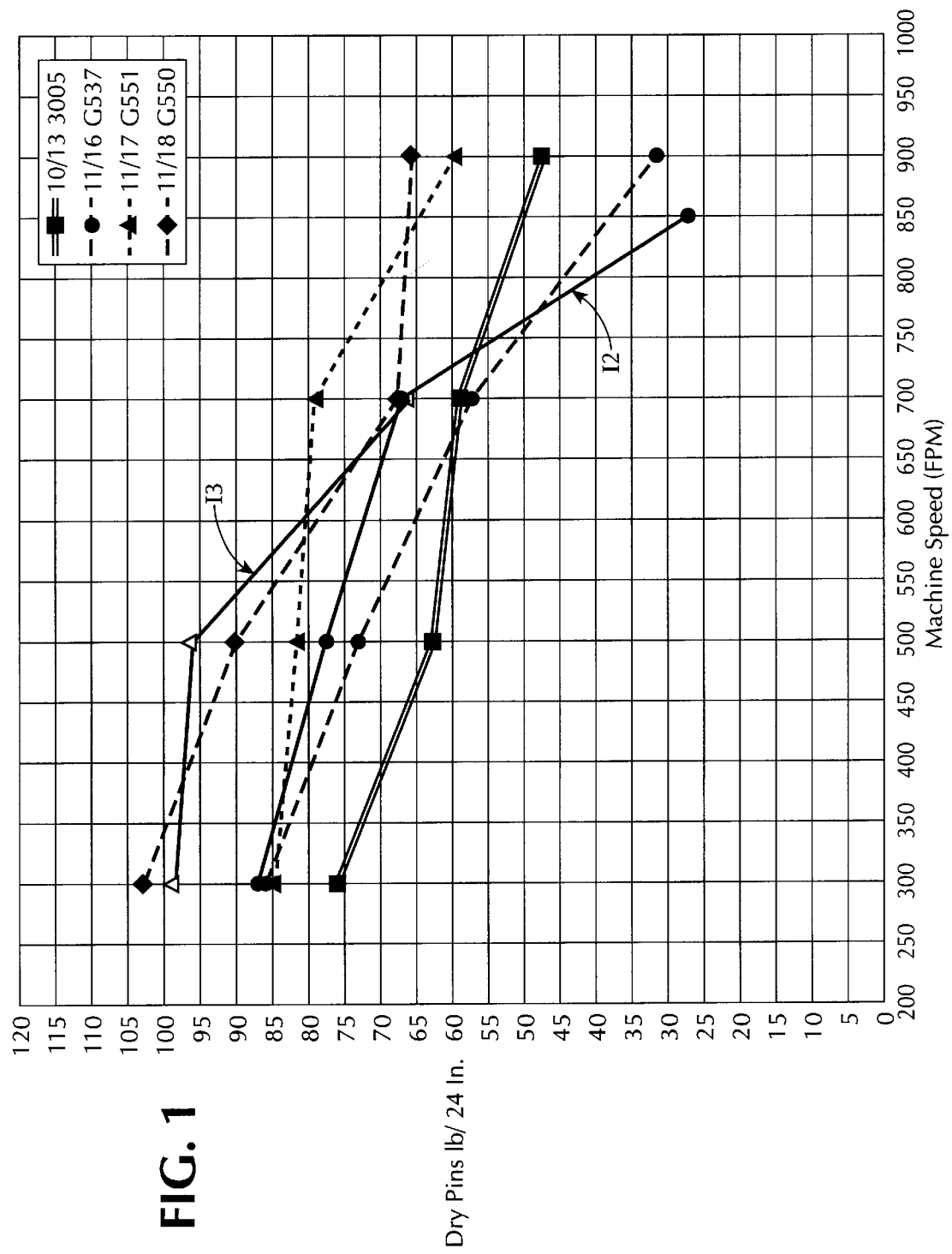
FIG. 1 is a plot of dry pin test results for corrugated samples using different adhesive formulations plotted against the machine speed at which the sample was taken.

In carrier type adhesives used in manufacturing corrugated products, a portion of the starch forms a carrier, often known as the carrier phase or the gelatinized phase, which suspends the balance of the starch, known as the suspended phase, which is in an ungelatinized state (also referred to as the suspension phase before it is admixed with the carrier phase). Under conditions of heat and pressure, the ungelatinized starch is rapidly hydrated and gelatinized to increase quickly the viscosity and adhesivity of the adhesive composition.

As discussed in U.S. Pat. No. 5,358,559, a carrier type adhesive composition is prepared in two separate portions involving a primary mixer, which combines the components of the carrier phase, and a secondary mixer which combines the components of the suspension phase. Reference is made to that patent for an acceptable method of producing a carrier type adhesive composition including mixing times, temperatures and proportions of ingredients including water, suspension phase starch, boron containing compounds, caustic and waterproofing/water resistant compounds.

Any mixing system which is capable of separately producing the carrier phase is useful in the preparation of the adhesives of this invention. A particularly preferred system is the Stein-Hall system manufactured by the Ringwood Company, Chicago, Ill., USA, consisting of a 250 gallon primary mixer and a 666 gallon secondary mixer.

In one embodiment of the invention, the carrier phase of the adhesive composition comprises tapioca fiber and corn fiber. In a most preferred embodiment the tapioca fiber and corn fiber are present in approximately equal amounts. However the tapioca fiber can be used in an amount from about 100% to about 25%, preferably from about 75% to about 25% and the corn fiber can be used in an amount from about 0% to about 75%, preferably from about 25% to about 75%. The term "fiber" is meant to include plant fibers which contain starch as a component. Fiber recovered during the wet milling of plant stock is useful. European Patent Application No. 552,478 A2 (National Starch and Chemical Investment Holding Corporation) discloses a suitable process for producing tapioca fiber which is useful in this invention. Tapioca fiber will generally contain from about 35–70% tapioca starch, preferably from about 45–60% tapioca starch and more preferably from about 50–55% tapioca starch. (Tapioca is also known as "yucca" in certain parts of Central and South America.) Suitable tapioca fiber is available from Industrias del Maiz S.A., Avenida 3 Norte No. 71–80, Cali, Columbia. The corn fiber can be corn pericarp and a preferred type of corn fiber is dietary corn fiber which is sold under the designation Lauhoff corn fiber by the Lauhoff Grain Company, Danville, Ill., USA. (The Lauhoff corn fiber is a purified corn pericarp containing about 5% to about 10% starch.) The corn fibers used according to the invention can generally contain from about 5% to about 30% starch.

In another embodiment, the carrier phase comprises tapioca fiber and corn fiber in the form of spent germ flake. "Spent germ flake" refers to the resulting solids from the oil extraction step in the corn wet milling process. A source of suitable spent germ flake is from corn wet milling hexane extraction. Spent germ flake contains up to about 30% starch that helps to build more viscosity in the finished paste. Substitution of spent germ flake for corn fiber produces a finished paste viscosity two to three times greater than the viscosity of the tapioca/corn fiber without the addition of PVOH. By using spent germ flake, it is relatively easy to lower the viscosity by decreasing the amount of borax, while still producing a paste with good tack and forming a good bond. Spent germ flake therefore provides the advantages of a higher initial viscosity.

A combination of corn fiber and spent germ flake with the tapioca fiber also can be employed in a further embodiment of the invention.

As an additional component of either of these embodiments, the carrier phase can contain from about 0% to about 5% polyvinyl alcohol and/or from about 0t to about 5% polyvinyl acetate, preferably from about 0% to about 3% and most preferably from about 1% to about 3% polyvinyl alcohol and/or polyvinyl acetate, the percentages being based on total fiber plus starch. The addition of these substances or other polyhydroxyl compounds provide for improved adhesive qualities, such as increased "green strength", the characteristic that holds the paper together until the full strength of the adhesive develops. Polyvinyl alcohol in the presence of starch will develop adhesive tackiness faster in the presence of the boron containing compound which means that the corrugating machines can operate at higher speeds. A suitable polyvinyl alcohol is sold under the trade name Airvol 603 PVOH, Air Products and Chemicals, Inc., Allentown, Pa. A suitable polyvinyl acetate is available under the designation CD-46-33 from Sonoco Adhesives Co., P.O. Box 338, Akron, Ind. 46910 USA. The polyvinyl alcohol or polyvinyl acetate can be added to either the primary mixer containing the carrier phase or the secondary mixer containing the suspension phase.

As noted above, the composition of the invention comprising tapioca fiber and corn fiber or tapioca fiber and spent germ flake or tapioca fiber, spent germ flake and corn fiber can replace some or all of the starch conventionally used (the "carriez starch") in preparing the carrier phase of a corrugating adhesive. In order to obtain the benefits of the composition of the invention, it should be used to replace at least about 30% of the carrier starch, preferably at least about 50% and most preferably about 100%. The composition of the invention can comprise from about 25% to about 100% of tapioca fiber, from about 0% to about 75% corn fiber, from about 0% to about 75% spent germ flake, from about 0% to about 70% carrier starch and from about 0% to about 5%, preferably from about 0% to about 3% and most preferably from about 1% to about 3%, PVOH and/or PVA.

The invention also provides a method of making a corrugating adhesive composition which comprises:

a) mixing together water, tapioca fiber, corn fiber and carrier starch and heating to form an aqueous mixture;

b) adding caustic to the mixture from step (a) and mixing to form an aqueous mixture of tapioca fiber, corn fiber and caustic;

c) adding to the mixture from step (b) water having a lower temperature than the mixture and mixing to cool the mixture;

d) separately mixing together water, a boron containing compound and starch and heating to form an aqueous mixture; and e) combining the mixture from step (c) with the mixture from step (d) to form the corrugating adhesive composition.

In the practice of this method the mixture in step (a) is heated to a temperature of between about 115° F. (46° C.) and about 180° F. (82° C.), with a temperature of about 140° F. preferred. The mixture in step (a) is mixed for a period of between about 5 and 15 minutes. In a preferred embodiment the tapioca fiber and corn fiber are present in equal amounts. At this point caustic is added according to step (b) in an amount of from about 8 to about 20% of the total composition to attain a pH from about 10 to 14 and mixed with sustained heating for a period of between about 10 and 40 minutes. The caustic is preferably sodium hydroxide, but potassium hydroxide, calcium hydroxide or ammonium hydroxide can be used. Next, water at a temperature lower than the temperature of the mixture, usually between about 35° F. and 85° F., is added according to step (c) to cool the mixture. Separately, water, the boron containing compound in an amount of between about 30% and 100% based on the dry weight of total caustic, and starch is added and heated to form the mixture of step (d). This mixture is stirred for a period of between about 1 and 15 minutes. The adhesive composition is formed by gradually adding the mixture of step (c) to the mixture of step (d) with continuous stirring, preferably over a period of between about 5 to 45 minutes. (Those who are skilled in the art generally refer to the mixer used to prepare the mixture of step (c) as the primary mixer and the mixer used to prepare the mixture of step (d) as the secondary mixer.) This composition can be used immediately or can be stored for later use. The adhesive composition can be stored at room temperature or heated slightly. It is preferred that any stored adhesive composition be maintained at an elevated temperature of about 100° F. and intermittently stirred, for example, it can be stirred for 5 minutes every 25 minutes.

In a preferred embodiment of this method either polyvinyl alcohol or polyvinyl acetate can be added in step (a). The polyvinyl alcohol or polyvinyl acetate is most preferably added in an amount of about 1% to about 3% w/w of total starch plus fiber in the adhesive composition.

In other embodiments of the method in step (a), spent germ flake is substituted for some or all of the corn fiber to form an aqueous mixture with the tapioca fiber. The remaining steps of this method can be carried out as detailed above.

EXAMPLES

Example 1

A 100% fiber carrier was made from 50% Lauhoff high dietary fiber corn bran and 50% tapioca fiber from Industrias del Maiz S.A. plus 1% or 3% Airvol 603 PVOH according to the following Table 1. I2 designates the batch with 1% PVOH and I3 designates the batch with 3% PVOH. The percent fiber in the formula is 9.4% of the total starch plus fiber solids.

TABLE 1

| Primary Mixer | | | | |
|---|---|---|---|---|
| Water | 10 | Liters (L) | 10 | L |
| Yucca/Corn | 4 | pounds (lb.) | 4 | lb. |
| PVOH | 190.4 | grams (g) | 571.2 | g |
| Caustic (50% dry basis) | 900 | g | 900 | g |
| Added Water | 2 | L | 2 | L |
| Cook Temperature | 150° | F. | 150° | F. |
| Cook Time | 15 | minutes (min) | 15 | min |
| Cool Water | 5.5 | L | 5.5 | L |
| Drop Time | 27 | min | 20 | min |
| Drop Temperature | 119° | F. | 119° | F. |

TABLE 1-continued

| Secondary Mixer | | |
|---|---|---|
| Water | 25 L | 20 L |
| Starch | 38.5 lb | 38.5 lb |
| Borax | 132 g | 132 g |
| Mix | 13 min | 13 min |
| Added water | 4 L | 3 L |
| Finish viscosity | 27 seconds (sec) | 32 sec |
| Finish temperature | 94° F. | 90° F. |
| Finish gel point | 139° F. | 143° F. |
| Finish Solids (% db) | 26.6 | 29.19 |

The tapioca and corn fibers were blended together just before the paste was made. The PVOH was added before the caustic during primary makeup. The corrugating paste formula of table 1 was based on a 200 pound carrier formula for a 666 gallon Stein-Hall system. About 40 liters of paste was made per batch. The paste was transferred to a holding tank and run as quick as possible on the corrugating machine.

Batch I2 (1% PVOH) finished with a 27 second viscosity at 94° F. and 26.6% db solids. Three hours later the viscosity measured 27 seconds at 87° F. The following morning the same material showed a viscosity of 40 seconds at 64° F. without any paste separation from the water in the mix. A gallon of this material was reheated to 99° F. in a water bath and the viscosity then measured 28 seconds at 99° F.

Batch I3 (3% PVOH) finished with a 32 second viscosity at 90° F. Slightly less secondary water was added to this batch. Three and one half hours later the viscosity measured 54 seconds at 87° F. Viscosity of this material was not measured the next day.

These adhesive compositions were compared to adhesive compositions using unmodified or modified corn starch in the carrier phase. The tests consisted of preparing corrugated material using 36 pound high performance liner and 26 pound corrugated medium. The paper combination was run on a 14 inch Langston single face corrugating machine up to a machine speed at which the medium delaminated almost completely from the liner, i.e. 900 feet per minute (fpm). Samples were taken at 300, 500, 700 and 900 fpm and tested for single face dry pin adhesion and edge crush analyses. Both of the tests were conducted according to the Technical Association of Pulp and Paper Industry, Inc. ("TAPPI") standard test methods. (Details of the test methods are published in TAPPI Test Methods 1989, available from TAPPI, One Dunwoody Park, Atlanta, Ga. 30341 USA.) The dry pin adhesion test is TAPPI T821 and edge crush analysis is TAPPI T811. Due to problems with the operation of the corrugating machine at speeds exceeding 700 fpm, data from samples above this speed are unreliable.

FIG. 1 shows a plot of the results of the dry pin test for the corrugated samples using different adhesive formulations plotted against the machine speed at which the sample was taken. The line connecting the solid boxes labeled "3005" represents the formulation containing unmodified starch in the carrier phase. The lines connecting the circles, triangles and diamonds, labeled G537, G551 and G550 respectively, represent formulations using modified starch in the carrier, the modified starches being sold under the designations G537, G551 and G550 by Corn Products, Argo, Ill., USA. The samples from I2 and I3 containing the tapioca and corn fibers are labeled on the graph. Both show favorable results in the test as compared to standard adhesive formulations.

Example 2

The following formulation was used to study the viscosity stability of the carrier formula at various levels of borax. The weights used represent laboratory scale mixing systems which are equivalent to a commercial mix of a 200-pound carrier formulation. The amount of borax in Table 2 represents an 80% borax formulation, based on the dry weight of total caustic. The same formulation was used for the 30% and 60% batches, based on the dry weight of total caustic, adjusting the amount of borax accordingly.

TABLE 2

| Primary Mix | |
|---|---|
| 1. Add primary water | 490 g |
| 2. Add heat | 140° F. |
| 3. Add tapioca fiber | 55 g |
| 4. Add corn fiber | 55 g |
| 5. Add PVOH | 7.6 g |
| 6. Mix for 5 min | |
| 7. Add Caustic (50% dry basis) | 34 g |
| 8. Mix for 20 min | |
| 9. Add cooling water | 370 g |
| 10. Mix for 5 min. | |
| Secondary Mix | |
| 1. Add secondary water | 1016 g |
| 2. Add heat | 90° F. |
| 3. Add Borax | 13.8 g |
| 4. Add unmodified corn starch | 650 g |
| 5. Mix for 10 min | |

The final temperature of the formulation was 98° F. with a viscosity of 27 seconds and a gel temperature of 155° F.

Figure 2:
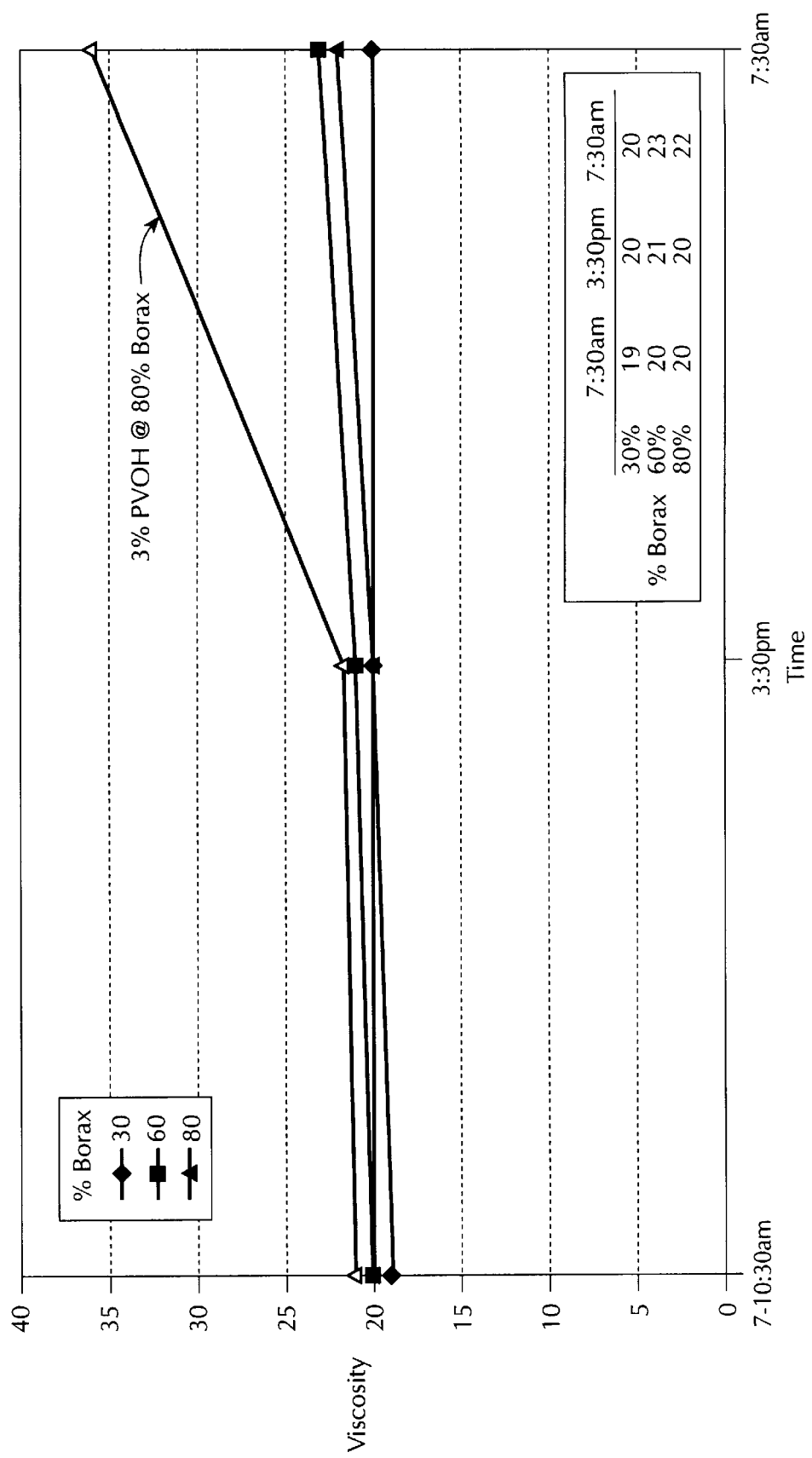
FIG. 2 shows the finished paste viscosity stability results for a 50/50 tapioca/corn fiber carrier paste.
Figure 3:
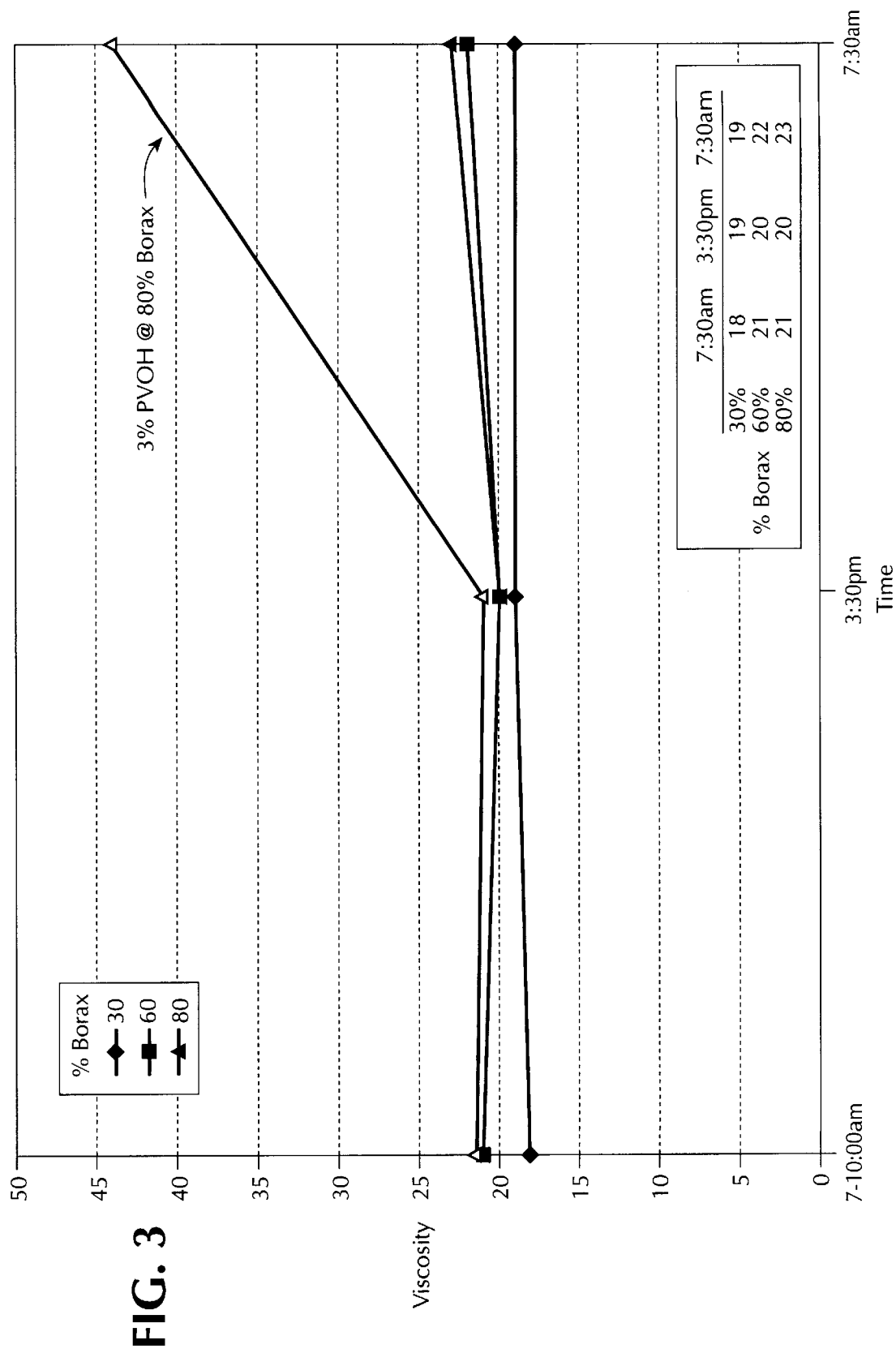
FIG. 3 shows the finished paste viscosity stability results for a 50/50 tapioca/corn fiber carrier paste.

FIGS. 2 and 3 show the finished phase viscosity stability results for a 50/50 tapioca/corn fiber carrier paste. The pastes were made with 1% PVOH (w/w total starch plus fiber) at three different levels of borax, 80%, 60% and 30% w/w based on total weight of dry caustic. The pastes were held overnight in a 100° F. water bath. FIG. 2 shows the results from the three levels of borax after holding without stirring. FIG. 3 shows the same but with intermittent stirring during the holding time to stimulate more closely commercial storage. For comparison, the results of a paste comprising 3% PVOH is superimposed. The 3% PVOH (w/w total starch plus fiber) formulation shows a substantial increase in viscosity after 24 hours. Both figures show relatively low initial viscosities for the pastes made with 1% and 3% PVOH. It is believed however that there would have been, particularly in those samples held without stirring, a viscosity increase over time for a starch based carrier paste.

Example 3

A scale up to a pilot plant operation representing a 200 pound commercial carrier formula was run on five separate occasions using the tapioca/corn fiber carrier formulation similar to that disclosed above but varying the amount of PVOH. Table 3 shows the results of tests on the viscosity during the initial run and after holding the paste for one and two days. All viscosity values are in seconds at 100° F. and the amount of PVOH is weight/weight (w/w)% total starch plus fiber.

TABLE 3

| Batch | % PVOH | Init. Visc. | 24 Hr. Visc. | 48 Hr. Visc. |
|---|---|---|---|---|
| I4 | 0 | 39 | 50 | 46 |
| I2 | 1 | 27 | 28 | |
| I5 | 1 | 25 | 27 | 28 |
| I7 | 1 | 24 | 32 | |
| I6 | 3 | 30 | 97 | |

Table 4 shows the data collected from runs using pastes of batches I4, I5 and I6. The samples are identified by the batch number, the type of paper used (either HPL-35 pound high performance liner low heat or KRH-42 pound Kraft liner high heat), glue roll gap setting (either 12 mil or 20 mil) and the machine speed (between 300 and 900 feet per minute. For comparison, Table 5 shows the data on similar tests using unmodified starch carriers. The machine runs made in the pilot plant using the tapioca/corn fiber paste produce single face dry pin adhesion and edge crush results that were equivalent to or better than the pilot plant results for starch carrier pastes.

TABLE 4

Test Results
C.P.C. Single-Facer Trial - Series 5

| Sample Identification | Edge Crush (#/In) | | Flat Crush (PSI) | | Single-Face Pin Adhesion (#/24 Ln In) | | Fiber Pull (%) |
|---|---|---|---|---|---|---|---|
| | Avg. | S.D. | Avg. | S.D. | Average | Std. Dev. | |
| 613-I4-HPL-12-300 | 24.7 | 1.5 | 35.7 | 1.2 | 109.7 | 7.6 | Medium |
| 613-I4-HPL-12-500 | 25.0 | 1.2 | 35.9 | 1.1 | 98.5 | 8.7 | Medium |
| 613-I4-HPL-12-700 | 25.3 | 1.2 | 37.2 | 0.6 | 89.2 | 4.6 | Medium |
| 613-I4-HPL-12-900 | 25.7 | 1.8 | 37.1 | 0.8 | 52.2 | 20.5 | 0/w |
| 613-I5-HPL-20-300 | 30.0 | 1.1 | 33.7 | 1.0 | 126.5 | 8.2 | Medium |
| 613-I5-HPL-20-500 | 27.6 | 1.6 | 36.1 | 0.6 | 113.8 | 5.3 | Medium |
| 613-I5-HPL-20-700 | 26.3 | 1.2 | 37.2 | 1.3 | 80.1 | 15.2 | 0 |
| 613-I5-HPL-20-900 | 23.1 | 1.8 | 37.7 | 1.6 | 51.0 | 7.5 | 0/w |
| 613-I5-HPL-12-300 | 26.6 | 1.1 | 33.5 | 1.1 | 111.6 | 8.2 | Medium |
| 613-I5-HPL-12-500 | 25.5 | 1.8 | 36.0 | 0.6 | 103.4 | 6.5 | Medium |
| 613-I5-HPL-12-700 | 23.9 | 1.4 | 35.4 | 0.9 | 84.8 | 9.5 | Medium |
| 613-I5-HPL-12-900 | 23.6 | 1.8 | 26.4 | 1.1 | 65.8 | 11.1 | 0 |
| 613-I5-HPL-20-300 | 27.3 | 1.4 | 33.5 | 0.5 | 131.5 | 6.7 | Medium |
| 613-I5-HPL-20-500 | 26.1 | 1.1 | 37.1 | 1.5 | 102.6 | 11.5 | Medium |
| 613-I5-HPL-20-700 | 24.3 | 1.5 | 26.2 | 1.1 | 88.4 | 4.3 | 0 |
| 613-I5-HPL-20-900 | 21.2 | 1.5 | 36.1 | 1.2 | 43.3 | 3.8 | 0/w |

TABLE 4-continued

Test Results
C.P.C. Single-Facer Trial - Series 5

| Sample Identification | Edge Crush (#/In) | | Flat Crush (PSI) | | Single-Face Pin Adhesion (#/24 Ln In) | | Fiber Pull (%) |
|---|---|---|---|---|---|---|---|
| | Avg. | S.D. | Avg. | S.D. | Average | Std. Dev. | |
| 613-I5-KRH-12-300 | 26.3 | 1.2 | 28.9 | 0.5 | 106.8 | 3.5 | 35 |
| 613-I5-KRH-12-520 | 25.2 | 1.1 | 31.2 | 1.5 | 101.7 | 7.8 | 20 |
| 613-I5-KRH-12-700 | 25.2 | 1.4 | 31.1 | 0.9 | 74.3 | 7.5 | Medium |
| 613-I5-KRH-12-900 | 21.9 | 1.3 | 30.4 | 0.4 | 34.2 | 6.8 | 0/w |
| 613-I5-KRHP-12-300 | 24.4 | 1.8 | 29.5 | 1.5 | 112.9 | 5.2 | Medium |
| 613-I5-KRHP-12-500 | 24.4 | 1.4 | 30.0 | 1.0 | 100.7 | 5.7 | Medium |
| 613-I5-KRHP-12-700 | 22.5 | 1.5 | 31.1 | 0.8 | 83.0 | 5.5 | Medium |
| 613-I5-KRHP-12-900 | 23.1 | 2.1 | 20.1 | 0.9 | 37.7 | 8.5 | 0/W |
| 614-I6-HPL-12-300 | 25.3 | 1.6 | 34.4 | 1.0 | 100.0 | 7.3 | Medium |
| 614-I6-HPL-12-500 | 25.5 | 1.2 | 26.1 | 0.7 | 89.4 | 7.2 | Medium |
| 614-I6-HPL-12-700 | 25.2 | 1.0 | 35.6 | 1.6 | 77.3 | 8.2 | Medium |
| 614-I6-HPL-12-900 | 22.8 | 2.9 | 38.3 | 1.0 | 40.7 | 6.9 | 0/w |
| 614-I6-HPL-20-300 | 26.9 | 1.5 | 34.9 | 1.8 | 123.2 | 7.1 | Medium |
| 614-I6-HPL-20-500 | 26.4 | 1.3 | 37.2 | 0.9 | 113.9 | 6.8 | Medium |
| 614-I6-HPL-20-700 | 25.2 | 1.3 | 37.7 | 1.4 | 70.9 | 7.8 | 0/W |
| 614-I6-HPL-20-900 | Loose Liner | | | | Loose Liner | | |
| 614-I6-HPLT-12-300 | 27.1 | 0.9 | 34.3 | 1.2 | 101.5 | 7.0 | Medium |
| 614-I6-HPLT-12-500 | 25.9 | 1.5 | 35.6 | 1.4 | 98.9 | 8.6 | Medium |
| 614-I6-HPLT-12-700 | 25.3 | 0.8 | 35.9 | 1.5 | 89.2 | 6.6 | Medium |
| 614-I5-HPLT-12-900 | 24.3 | 1.8 | 38.6 | 1.0 | 72.0 | 5.7 | 0 |
| 614-K1-HPL-12-300 | 26.5 | 1.1 | 32.9 | 0.5 | 103.5 | 3.6 | Medium |
| 614-K1-HPL-12-500 | 25.0 | 1.1 | 36.2 | 2.2 | 83.9 | 3.4 | Medium |
| 614-K1-HPL-12-700 | 24.4 | 0.9 | 39.5 | 2.4 | 88.0 | 7.7 | Medium |
| 614-K1-HPL-12-800 | 25.8 | 1.5 | 27.4 | 1.2 | 80.6 | 3.3 | 0 |
| 614-K1-HPL-12-900 | Loose Liner | | | | Loose Liner | | |

TABLE 5

BASELINE DATA - PEARL STARCH - SINGLE FACE DRY PINS

| 0 SERIES NUMBER | 1 CODE NUMBER (1) | 2 GLUE ROLL GAP | 3 SPEED FPM | 4 DRY PIN LB/12 IN | 5 EDGE CRUSH LB/IN |
|---|---|---|---|---|---|
| 1 1-1 | 1012-p1-42/26 | 20 | 300 | 97.2 | 22.8 |
| 2 | | | 500 | 83.4 | 21.8 |
| 3 | | | 700 | 61.8 | 20.6 |
| 4 | | | 900 | 35.0 | 17.4 |
| 5 | | | | | |
| 6 1-2 | 1012-p1-42/26 | 12 | 300 | 70.9 | 23.5 |
| 7 | | | 500 | 60.9 | 20.1 |
| 8 | | | 700 | 45.6 | 19.2 |
| 9 | | | 900 | 0.0 | 0.0 |
| 10 | | | | | |
| 11 1-3 | 1013-p2-hpl | 20 | 300 | 80.5 | 19.4 |
| 12 | | | 500 | 77.4 | 19.9 |
| 13 | | | 700 | 51.6 | 18.8 |
| 14 | | | 900 | 36.7 | 18.6 |
| 15 | | | | | |
| 16 1-4 | 1013-p2-hpl | 12 | 300 | 76.1 | 18.8 |
| 17 | | | 500 | 62.7 | 18.7 |
| 18 | | | 700 | 59.0 | 18.2 |
| 19 | | | 900 | 47.2 | 18.2 |

CODE NUMBER → DATE - PASTE BATCH - PAPER TYPE
PASTE BATCH - P → PEARL STARCH
PAPER TYPE - HPL → HIGH PERFORMANCE LINER AND LOW TEMPERATURE PREHEAT
42/26 → POUND KRAFT LINER, 26 POUND MEDIUM

Example 4

Figure 4:
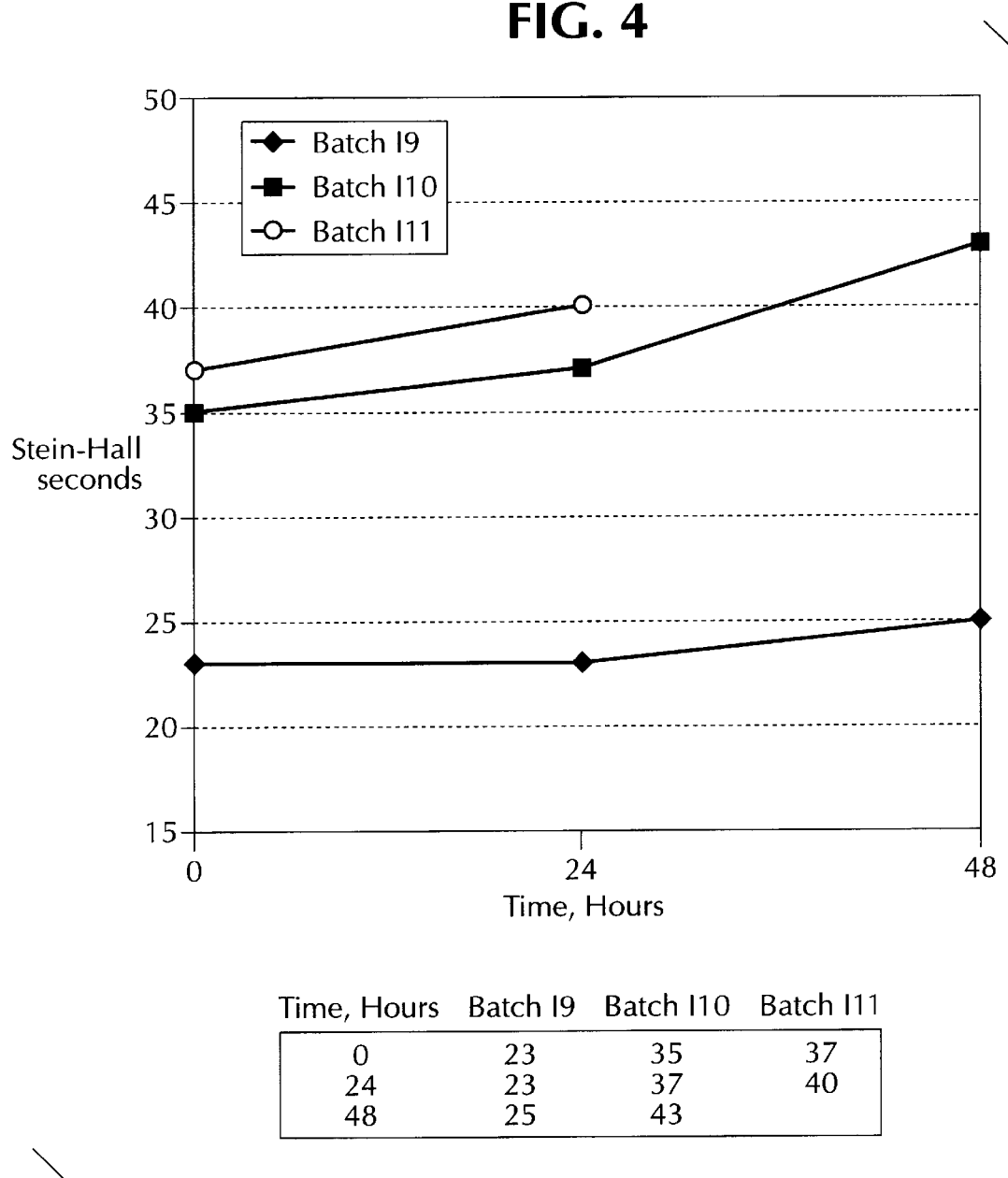
FIG. 4 shows the viscosity stability of carrier formulations using tapioca fiber and spent germ flake.
Figure 5:
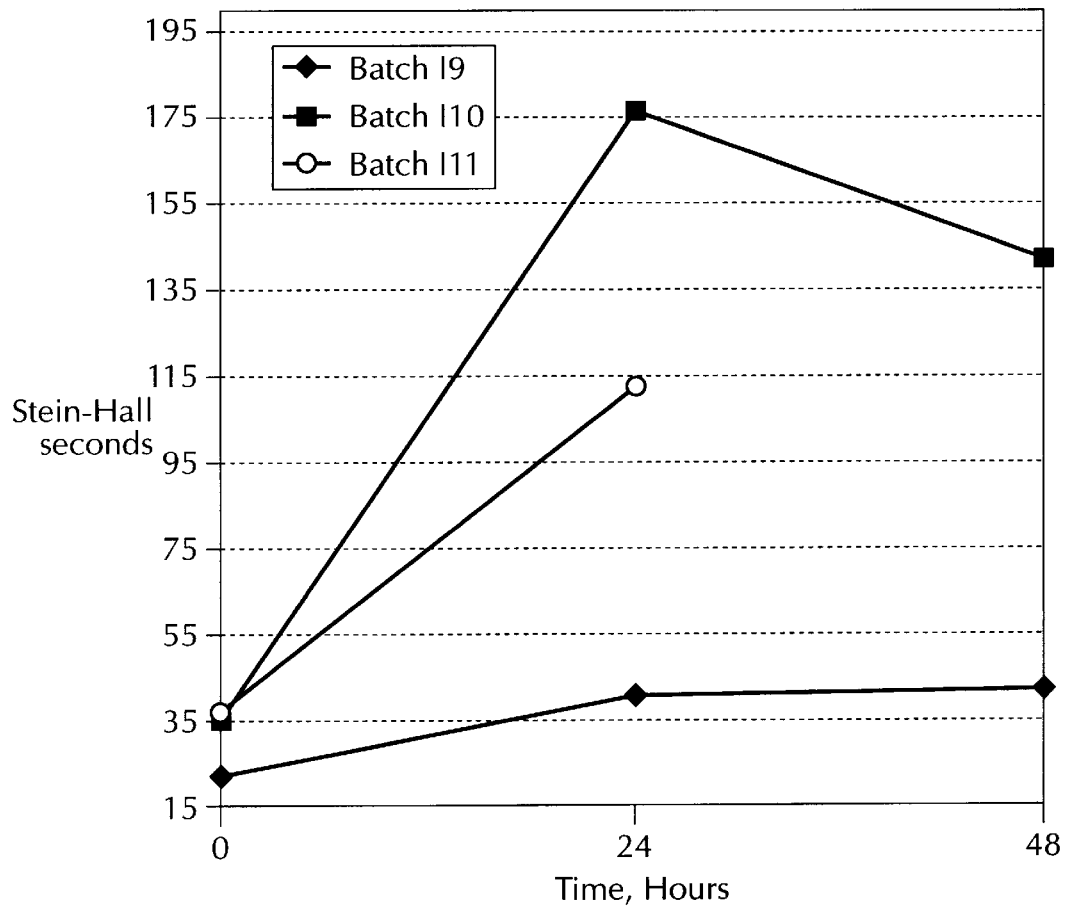
FIG. 5 shows the viscosity stability of carrier formulations using tapioca fiber and spent germ flake.
Figure 6:
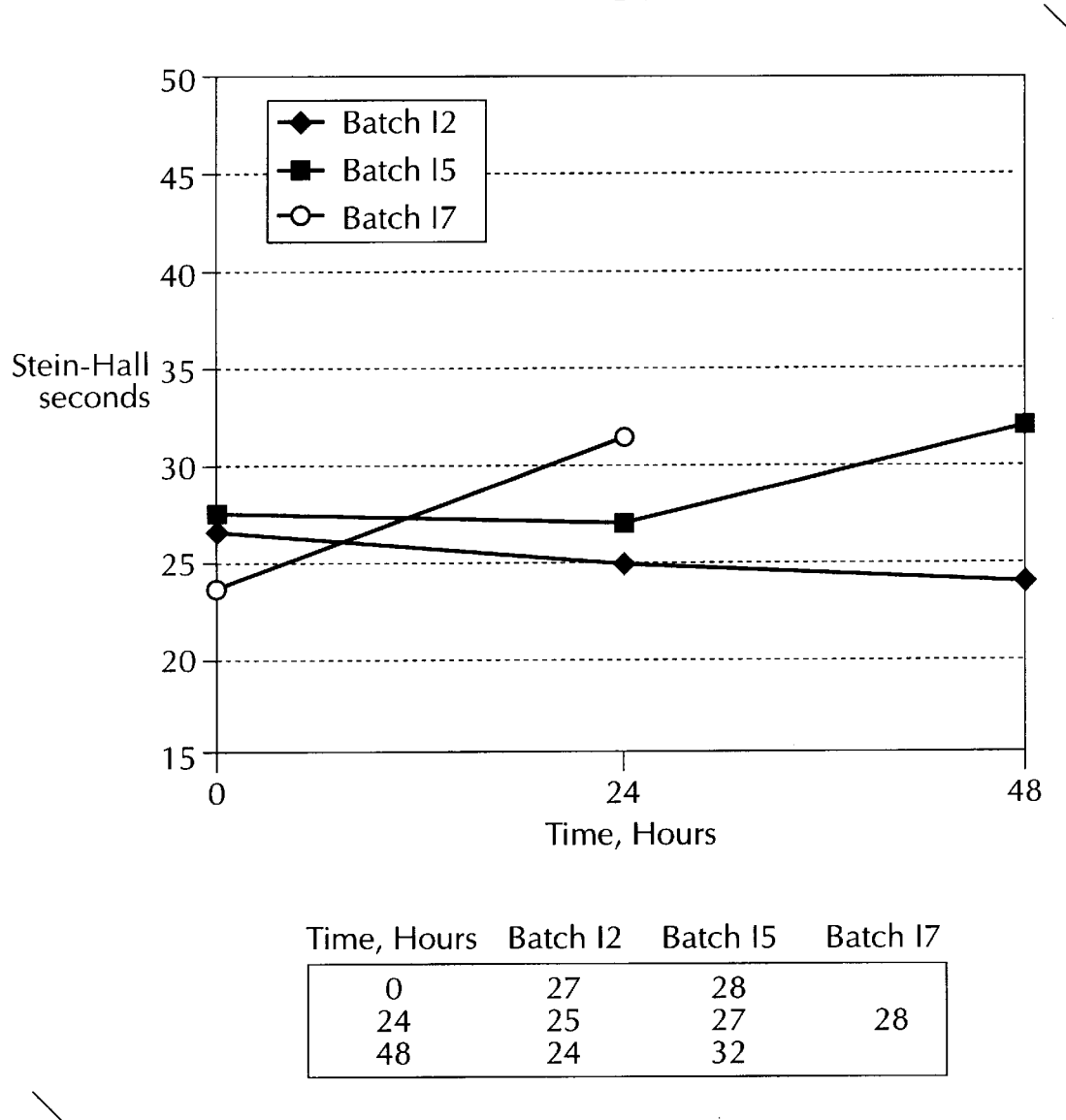
FIG. 6 shows hot viscosity stability of three batches of tapioca/corn fiber carrier formulations.

FIGS. 4 and 5 detail the viscosity stability of carrier formulations using tapioca fiber and spent germ flake. The figures show the viscosity initially upon completion of the mix and after holding for 24 and 48 hours without stirring. The batches were prepared in the same way except that batch I9 contained 1% PVOH, batch I10 contained no PVOH, and batch I11 contained 1% PVA. FIG. 4 shows the viscosity measured at 100° F. The pastes were not held at this temperature but were reheated in a hot water bath. FIG. 5 shows the cold paste viscosity measured at the temperature at which they were found, between 59 and 66° F. For comparison FIG. 6 shows hot paste viscosity stability of three batches of tapioca/corn fiber carrier formulations shown in Table 3. Only the tapioca/spent germ flake carrier composition containing PVOH showed good cold paste viscosity stability. This paste would have been usable without reheating.

Having set forth the general nature and some specific examples of the present invention, the scope of the invention is now more specifically set forth in the appended claims.

What is claimed is:

1. A corrugated board comprising a corrugated medium bonded to a flat sheet of paper using a starch-based corrugating adhesive composition comprising a carrier phase and a suspended phase, the improvement comprising replacing from about 30 wt. % to about 100 wt. % of a carrier starch in the carrier phase with a carrier starch replacement composition comprising
   from about 100 wt. % to about 25 wt. % tapioca fiber;
   from about 0 wt. % to about 75 wt. % corn fiber; and
   from about 0 wt. % to about 5 wt. % polyvinyl alcohol and/or polyvinyl acetate.

2. A method of making corrugated board comprising bonding a corrugated medium to a flat sheet of paper using a starch-based corrugating adhesive composition comprising a carrier phase and a suspended phase, the improvement comprising replacing from about 30 wt. % to about 100 wt. % of a carrier starch in the carrier phase with a carrier starch replacement composition comprising
   from about 100 wt. % to about 25 wt. % tapioca fiber;

from about 0 wt. % to about 75 wt. % corn fiber; and from about 0 wt. % to about 5 wt. % polyvinyl alcohol and/or polyvinyl acetate.

3. A method of making a starch-based corrugating adhesive composition comprising a carrier phase and a suspended phase, the suspended phase comprising starch, a boron containing compound and water and the carrier phase comprising from about 0 wt. % to about 70 wt. % of a carrier starch and from about 100 wt. % to about 30 wt. % of a carrier starch replacement composition, the carrier starch replacement composition comprising from about 100 wt. % to about 25 wt. % tapioca fiber, from about 0 wt. % to about 75 wt. % corn fiber and from about 0 wt. % to about 5 wt. % polyvinyl alcohol and/or polyvinyl acetate, comprising a) mixing together water, tapioca fiber, corn fiber, carrier starch and polyvinyl alcohol and/or polyvinyl acetate, and heating to form an aqueous mixture;

b) admixing caustic with the mixture from step (a);

c) adding water to the mixture from step (b), the water having a lower temperature than the mixture, and mixing to cool the mixture;

d) separately mixing together water, a boron containing compound and starch and heating to form another aqueous mixture; and e) combining the mixture from (c) with the mixture from (d) to form the corrugating adhesive composition.

4. The method of claim 3 wherein the corn fiber comprises from about 0 wt. % to about 100 wt. % spent germ flake and/or corn pericarp.

5. The method of claim 4 wherein the tapioca fiber contains from about 35–70 wt. % tapioca starch and the corn fiber contains from about 5 wt. % to about 30 wt. % corn starch.

6. The method of claim 5 wherein the carrier starch replacement composition comprises from about 75 wt. % to 25 wt. % tapioca fiber and from about 25 wt. % to 75 wt. % corn fiber.

7. The method of claim 5 wherein the tapioca fiber and corn fiber are present in about equal amounts.

8. The method of claim 5 wherein the carrier starch replacement composition comprises from about 0 wt. % to about 3 wt. % polyvinyl alcohol and/or polyvinyl acetate.

9. The method of claim 5 wherein the carrier starch replacement composition comprises from about 1 wt. % to about 3 wt. % polyvinyl alcohol and/or polyvinyl acetate.

10. The method of claim 3 wherein the mixing of step (a) is conducted at a temperature of between about 115° F. and about 180° F. for a period of between about 5 and 15 minutes, the caustic in step (b) is admixed in an amount of from about 8 to about 20 wt. % of the total starch plus fiber to attain a pH from about 10 to 14 and the admixing of step (b) is for a period of between about 10 and 40 minutes with sustained heating, the water added in step (c) is at a temperature between 35° F. and 85° F., the boron containing compound of step (d) is added in an amount of between about 30 wt. % and 100 wt. % based on total weight of dry caustic and the mixture of step (d) is stirred for about 1 to 15 minutes, and the combining of step (e) is by gradually adding the mixture of step (c) to the mixture of step (d) with continuous stirring over a period of between about 5 to 45 minutes.

* * * * *